(12) United States Patent
Kemper et al.

(10) Patent No.: US 8,017,165 B2
(45) Date of Patent: Sep. 13, 2011

(54) METHOD OF REDUCING OIL CONTENT IN DRY DISTILLERS GRAIN WITH SOLUBLES

(75) Inventors: Timothy G. Kemper, Marietta, GA (US); Adolfo T. Subieta, Marietta, GA (US)

(73) Assignee: DeSmet Ballestra North America, Inc., Marietta, GA (US)

( * ) Notice: Subject to any disclaimer, the term of this patent is extended or adjusted under 35 U.S.C. 154(b) by 350 days.

(21) Appl. No.: 12/287,254

(22) Filed: Oct. 7, 2008

(65) Prior Publication Data

US 2009/0104325 A1    Apr. 23, 2009

Related U.S. Application Data

(60) Provisional application No. 60/999,253, filed on Oct. 17, 2007.

(51) Int. Cl.
A23K 1/06        (2006.01)
(52) U.S. Cl. .................... 426/429; 426/430; 426/425
(58) Field of Classification Search .................. 426/429, 426/425
See application file for complete search history.

(56) References Cited

U.S. PATENT DOCUMENTS

| | | | |
|---|---|---|---|
| 3,946,952 A | | 3/1976 | Martin |
| 3,976,793 A | * | 8/1976 | Olson et al. ................. 426/96 |
| 4,246,184 A | * | 1/1981 | Pressick et al. ............. 554/15 |
| 4,307,064 A | | 12/1981 | Barger et al. |
| 4,313,912 A | | 2/1982 | Barger |
| 4,332,092 A | | 6/1982 | Hansotte |
| 4,617,270 A | | 10/1986 | Anderson et al. |
| 4,979,887 A | | 12/1990 | Groebli et al. |
| 5,591,416 A | | 1/1997 | Kemper et al. |
| 5,705,133 A | | 1/1998 | Kemper et al. |
| 5,992,050 A | | 11/1999 | Kemper et al. |
| 6,313,328 B1 | | 11/2001 | Ulrich et al. |
| 7,083,954 B2 | | 8/2006 | Jakel et al. |
| 2004/0087808 A1 | | 5/2004 | Prevost et al. |
| 2006/0040024 A1 | | 2/2006 | Srinivasan et al. |
| 2010/0092603 A1 | * | 4/2010 | Bruinsma et al. ............. 426/2 |

* cited by examiner

*Primary Examiner* — Anthony Weier
(74) *Attorney, Agent, or Firm* — Wegman, Hessler & Vanderburg

(57) ABSTRACT

Method of reducing residual oil in DDGS by pulverizing and pelletizing the DDGS followed by extraction with an organic solvent.

8 Claims, 1 Drawing Sheet

METHOD OF REDUCING OIL CONTENT IN DRY DISTILLERS GRAIN WITH SOLUBLES

CROSS-REFERENCE TO RELATED APPLICATION

This application claims the priority benefit of U.S. Provisional Patent Application Ser. No. 60/999,253 filed Oct. 17, 2007.

FIELD OF THE INVENTION

The invention pertains to methods for reducing the oil content of DDGS.

BACKGROUND OF THE INVENTION

Corn is processed for many purposes including industrial uses and for human and animal consumption. Corn comprises starch (referred to as the carbohydrate or sugar component), protein, fat (also referred to as oil) and fiber. One significantly expanding use is the production of ethanol from corn with the resulting ethanol being used, as an example, as a substitute for petroleum fuel. The so-called Dry Grind method is the most popular method used to produce ethanol today. About 70% of the currently produced ethanol in the U.S. is made by this method and the trend throughout the country is pointing to an overall increase in ethanol production and concomitant increase in use of this Dry Grind process.

In the Dry Grind process, starch is converted to ethanol. The corn is first ground into corn flour with water then added to form a slurry. The slurry is treated in the presence of enzymes to convert the sugars to glucose. The glucose is fermented using yeast to produce crude ethanol. The crude ethanol-water mixture is distilled to yield purified ethanol.

From the distillation step, the solids or "grains" coming out of the distilling column are referred to as distillers grains. The water coming out of the distillation column is evaporated and the resulting "solubles" are mixed with the distillers grains. This mixed combination is commonly known as distillers grains with solubles. After these are dried, they are referred to as dry distillers grains with solubles (DDGS).

DDGS consists mostly of corn minus the starch component. The remaining components are protein, fat (i.e., oil), fiber and some residual starch. Protein content is approximately 25-29%, fat about 10-11%, and from about 7-9% of the DDGS is moisture.

DDGS lysine value is approximately 0.9% compared to 3.0% for soybean meal. Its high bypass protein and high fat content make it ideal dairy cattle feed. Its high bypass protein is ideal for beef cattle but the high fat content is problematic. The high bypass protein, high fat, high fiber and low lysine make it a poor quality swine/poultry feed. By removing the fat content, DDGS can be fed in much higher rations to beef cattle.

SUMMARY OF THE INVENTION

The invention pertains to a process for reducing the residual oil content of DDGS. The DDGS is first heated to about 90° F. or checked to make sure that the initial temperature thereof is at least about 90° F., pulverized or ground to form small particles and then pelletized. The pellets are subjected to a solvent extraction step to remove the corn oil using an organic solvent as the solvent medium. The extraction step reduces the residual oil content of the DDGS.

DETAILED DESCRIPTION OF EXEMPLARY EMBODIMENTS

Figure 1:
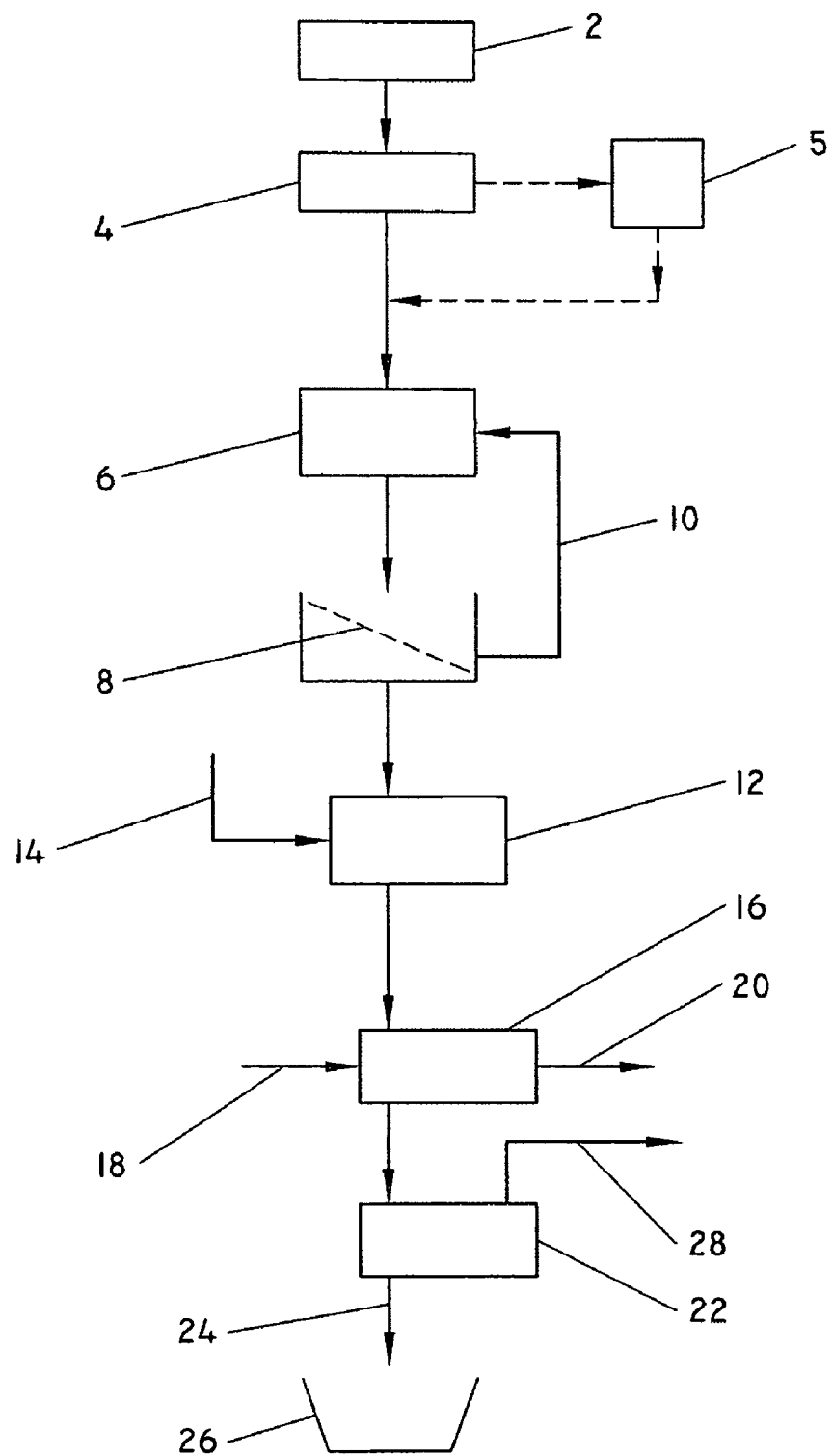
FIG. 1 is a diagrammatic view of the preferred method.

In accordance with the invention, DDGS is loaded into a variable speed hopper 2 to feed the plant at a steady rate. The DDGS is then passed under a plate magnet or other metal separatory device 4 wherein metal is removed from the DDGS as it travels through the separatory unit. In those cases wherein the temperature of the material is not greater than about 90° F., the material is passed through a heating device 5 to warm the temperature to approximately 90° F. The heating device may be comprised of a vertical stacked steam tray cooker, vertical stacked steam tube cooker, horizontal rotary steam-tube cooker, or the like. The artisan will appreciate that the heating step can be omitted in those situations wherein the DDGS has already attained the desired temperature such as by warm climate conditions and the like. As shown, the warm material is then passed to a hammer mill 6 having a 5/64 inch holed screen. In the hammer mill, the DDGS is shredded into very fine particles as is common in the art. As is known in the art, the hammer mill may comprise a steel drum containing a vertical or horizontal cross-shaped rotor on which pivoting hammers are mounted. The hammers are free to swing on the ends of the cross. The rotor is spun at a high speed inside the drum while the DDGS material is fed into the feed hopper. The DDGS material is pulverized by the hammers on the ends of the rotating cross and is thereby shredded and expelled through screens in the die. The thus shredded or pulverized DDGS material is then forwarded to a sieve, preferably having about a 30-40, preferably about a 34 mesh screen. Material passing through the screen will typically have a particle size of about 0.4-0.8 mm, preferably 0.6 mm. Material not passing through the screen is returned to the hammer mill via return line 10.

The finely divided DDGS material is then passed to a pellet mill 12 to create pellets from the mixture of finely divided DDGS material and a fluid ingredient such as steam. As shown in the drawing, steam or other suitable fluid may be admitted to the pellet mill 12 via fluid entrance 14. In the pellet mill, the finely ground materials are formed into a larger, homogenous mass. Pellets exiting the pellet mill die typically will have diameters on the order of about 5/32 seconds inch and lengths of about 5/8 inch on the average but the artisan will appreciate that other pellet sizes may be used as long as the pellets substantially retain their shape without breakage or de-agglomeration as they move to the next stage in the process.

Fans or the like may be included in the pelletizing operation so as to cool the pellets to desired temperature. Fans from the pellet cooler pull out fines and may recycle them back to the hammer mill. The pellets are then conveyed to the next step, the extraction step, via a very slow (30 ft/min) aspirated drag conveyor.

The extractor 16 may be of any conventional type. However, preliminary tests have been conducted with a rotary extractor similar to the type described in U.S. Pat. No. 5,705,133. In these extractors, a plurality of rotating baskets are formed in a cylindrical container by the use of internal radially extended partitioning walls. A miscella distribution system is mounted above the baskets for applying varying strengths of miscella and concentrated solvent to the upper surface of the material contained in each basket. A disc-shaped screen is mounted beneath the baskets and forms the bottom of the baskets for supporting the material being processed. The screen is preferably composed of a plurality of pie-shaped segments. A large opening is defined in one area of one of the screens and permits material which has been processed to be dropped into a hopper for further processing. As shown in the drawings, an organic solvent is admitted into the extractor via feed inlet 18 with solvent and miscella exiting the exit conduit 20. Preferably, commercial hexane or isohexane is utilized as the extraction solvent.

The solids DDGS material is then forwarded to a conventional desolventizer toaster of the type shown for example in U.S. Pat. No. 4,332,092 or U.S. Pat. No. 5,992,050. In the desolventizer toaster 22, the DDGS is admitted into the top tray of a series of axially spaced treatment trays. The pellets enter the top and land on a pre-desolventizing tray which is steam heated. Each successive axially spaced tray may have stay bolts or the like therethrough for venting vapors from one tray to the next. Steam may be injected through a bottom perforated tray with the steam stripping the final solvent from the DDGS. The steam and solvent vent upwardly through the trays and exit the desolventizer toaster via vapor recovery line 28. Countercurrent desolventization is achieved in these units. The DDGS material flows from one tray to the next successive tray through chutes, rotary valves, or the like. The solids DDGS material exits at 24 and is collected in storage bin 26. The vapor exiting via line 28 is utilized as a heat source for evaporating most of the solvent from the miscella exiting line 20 from the extractor. This concentrated miscella is then subjected to varying evaporation, stripping, and drying steps to recover crude corn oil and solvent.

EXAMPLES

In order to demonstrate the efficacy of the inventive method in reducing residue oil content of treated DDGS, a field trial was conducted at a western facility. The DDGS was loaded into a variable speed hopper to feed the plant at a steady rate. The DDGS passed under an Eriez plate magnet to remove metal and then passed to a CPM Champion hammer mill with 5/64 inch holes screen and 100 hp motor. The ground DDGS passed from the hammer mill to a Texas Shaker screener. The ground DDGS passing through a 34 mesh material was screen went on to the pellet mill feeder and the over 34 mesh material was recycled to the hammer mill. The pellet mill was a CPM pellet mill 5/32" hole diameter die and 150 hp motor. The pellets fell via gravity through a CPM pellet cooler (lower gates removed). The fan from the pellet cooler pulled out fines and recycled them to the hammer mill. The pellets were conveyed from prep to extraction via a slow (30 ft/min) aspirated drag conveyor.

The pellets then entered a French 10 ft diameter rotary extractor via a plug seal conveyor. They entered the extractor as a slurry. The extractor has 12 baskets (3.64 ft2 screen area each and 30.0 ft3 volume each). Basket 1 is slurry fed with $3^{rd}$ stage miscella, baskets 2/3 are sprayed with $3^{rd}$ stage miscella, baskets 4/5 are sprayed with $2^{nd}$ stage miscella, baskets 6/7 are sprayed with $1^{st}$ stage miscella, basket 8 is sprayed with fresh isohexane, baskets 9/10 are draining, and baskets 11/12 are empty. The spent pellets then entered a 4 high 85 inch diameter French DT with 133 ft3 total meal volume. The desolventized meal passed through a pneumatic conveyor to meal storage. The full miscella was passed through a liquid cyclone and on to a full miscella tank. The clean miscella passed through a rising film evaporator. The concentrated miscella passed to a concentrated miscella tank. The concentrated miscella passed through vacuum dryer thin film evaporators in series and then on to a mobile tote.

Field Trial Test Conditions were as Follows:
  DDGS feed rate: 3,000 lbs/hr
  DDGS density: 29.5 lbs/ft3
  DDGS temperature: 90 F
  DDGS moisture: 8.5%
  DDGS oil content: 10.5%/10.7%
  DDGS color: golden yellow
  Grinder absorbed power: 44-48 amps
  Grinder screen hole size: 5/64 inch diameter
  Ground DDGS temperature: 100 F
  Conditioned, ground DDGS temperature: 140 F
  Pellet mill conditioner live stream: 60 lbs/hr (calculated)
  Pellet mill power: 40-60 amps
  Pelletized DDGS temperature: 180 F
  DDGS pellet diameter: 5/32 inch
  DDGS pellet length: 5/8 inch average
  Cooled DDGS pellet temperature into extractor: 138 F
  Cooled DDGS pellet moisture into extractor: 8.4%
  Cooled DDGS pellet size profile into extractor:
    92.6%>6 mesh, 2.6% on 20 mesh, 3.4% on 40 mesh, 1.7%<40 mesh
  Cooled DDGS pellet density into extractor: 32.4 lbs/ft3
  Extractor speed: 268 minutes/revolution
  Extractor residence time: 223 minutes (3.7 hours)
  Extractor basket fill height: 80% (7.5 feet)
  Slurry filled DDGS pellet density: 46 lbs/ft3
  Extractor temperature: 120 F (4200 ft elevation & isohexane)
  Isohexane flow to extractor: 18 gpm first 12 hour, then 14.5 gpm
  Isohexane temp to extractor: 123 F
  Last basket flooding flux rate (fresh hexane): 4.95 gpm/ft2
  Full miscella concentration from extractor: 8.1%/10.1%/10.3%/11.3%/27.9%/25.5%
  Miscella flow to first stage evaporator: 16.5 gpm first 12 hours, then 13 gpm
  Miscella flow temperature from $1^{st}$ stage evaporator: 141 F
  Vacuum on first stage evaporator: 125 mm Hg abs pressure
  Miscella concentration from $1^{st}$ stage evaporator: 92.1%
  Vacuum on vacuum stripper/vacuum dryer: 7 mm Hg abs pressure
  Oil temp to vacuum stripper: 173 F
  Oil temp to vacuum dryer: 171 F
  Oil temp from vacuum dryer: 155 F
  Oil temp in storage: 140 F
  Meal temp from DT: 226 F
  Vapor temp from DT: 170 F (little sparge steam flow)
  Meal bulk density: 37.8 lbs/ft3
  Meal appearance: fine meal with a few remaining pellet fragments
  Meal color: tan
Residual Oil Content Results
  Finished meal ROC (5.7% H2O basis):
  0.62% in 22:00 Day 1 sample
  0.45% in 02:00 Day 2 sample
  0.74% in 06:00 Day 2 sample
  0.86% in 08:00 Day 2 sample
  0.86% in 11:00 Day 2 sample
  0.68% in 02:00 Day 3 sample
  0.74% in 05:00 Day 3 sample
  A total of 15,072 lbs of crude corn oil were extracted from 145,840 lbs of DDGS, representing 10.3% oil recovery over the entire run.

While the method herein described constitutes a preferred embodiment of this invention, it is to be understood that the invention is not limited to this precise arrangement of method steps and that changes may be made therein without departing from the scope of the invention which is defined in the appended claims.

The invention claimed is:

1. Method of reducing the oil content of dried distillers grain with solubles (DDGS) comprising grinding the DDGS to particle sizes of about 0.4-0.8 mm, pelletizing the DDGS in the presence of a fluid and then solvent extracting oil from the DDGS whereby residual oil content of said DDGS ranges from about 0.86% to about 0.45%.

2. Method as recited in claim 1 wherein said solvent comprises an organic solvent.

3. Method as recited in claim 2 wherein said organic solvent is commercial hexane or isohexane.

4. Method as recited in claim 1 wherein said grinding is conducted in a hammer mill.

5. Method as recited in claim 4 further comprising screening said DDGS after said grinding.

6. Method as recited in claim 5 comprising screening said DDGS with a 34 mesh screen.

7. Method as recited in claim 1 wherein said pelletizing comprises forming said DDGS into pellets of about 5/32 inch diameter and about 5/8 inch length.

8. Method as recited in claim 1 wherein said fluid is steam.

* * * * *